No. 809,542. PATENTED JAN. 9, 1906.
W. TORST, Jr.
OIL TANK INDICATOR.
APPLICATION FILED FEB. 6, 1905.
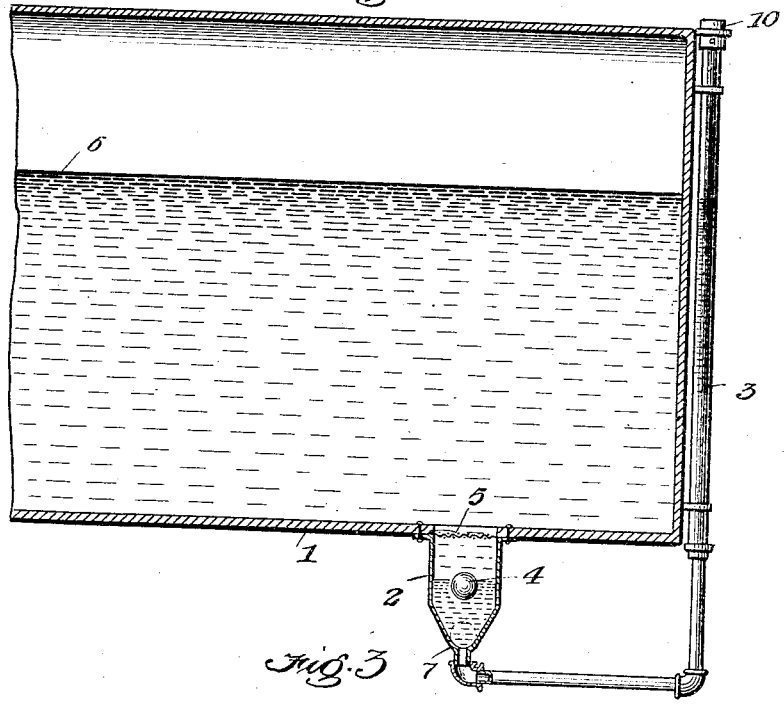
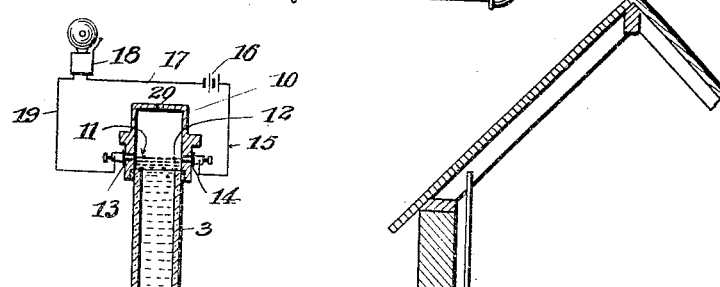
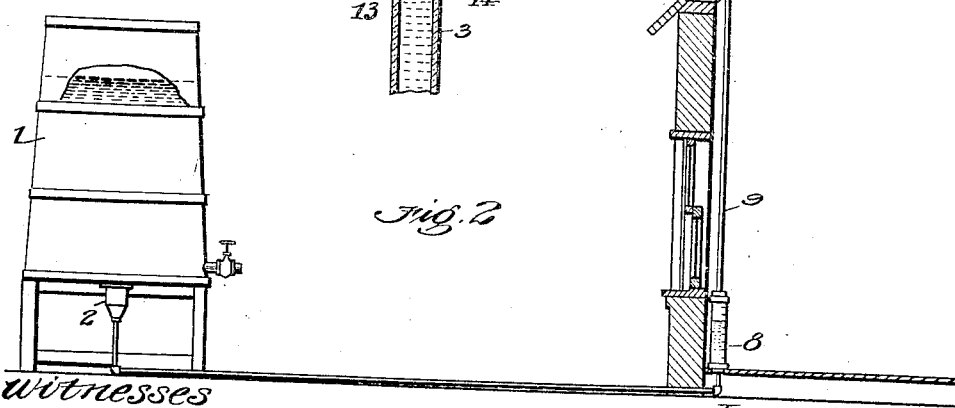
Witnesses
Inventor
William Torst Jr.
Attorneys.

UNITED STATES PATENT OFFICE.

WILLIAM TORST, JR., OF SAN PEDRO, CALIFORNIA, ASSIGNOR OF SEVEN-EIGHTHS TO T. J. BRUNDAGE AND ONE-EIGHTH TO ROBERT K. BRUNDAGE, OF FARMERSVILLE, CALIFORNIA.

OIL-TANK INDICATOR.

No. 809,542.　　Specification of Letters Patent.　　Patented Jan. 9, 1906.

Application filed February 6, 1905. Serial No. 244,515.

*To all whom it may concern:*

Be it known that I, WILLIAM TORST, Jr., a citizen of the United States, residing at San Pedro, in the county of Los Angeles and State of California, have invented new and useful Improvements in Oil-Tank Indicators, of which the following is a specification.

The object of my invention is to provide simple and reliable means whereby the exact amount of oil in an oil-tank is at all times indicated without the insertion into the tank or oil therein of sticks or rods usually used to indicate the amount of oil within the tank. As the crude oil is dark and opaque, a glass indicator-tube would be useless, as the oil when allowed to run through same colors the glass. Therefore glass is not used for this purpose. I accomplish this object by means of the device described herein and shown in the accompanying drawings, in which—

Figure 1 is a vertical section of an oil-tank usually placed on railway-cars having my indicator attached thereto, the indicator being shown partly in vertical section and partly in elevation. Fig. 2 is an elevation of a stationary tank having my indicator connected therewith and an office or station having a pipe extending from the tank to the office, the indicator proper being placed in the office or station. Fig. 3 is a detailed view of electrical means to ring a bell when the oil reaches a predetermined elevation.

In the drawings, 1 represents the casing of an oil-tank, such as is used on the trucks of railway-cars for the transportation of petroleum or crude oil, the truck or parts upon which the tank rests not being shown. Secured to the bottom of this tank is my oil-indicator valve, the casing thereof being marked 2 in the drawings. It is shown in vertical section immediately below the oil-tank. Extending therefrom and connected therewith is the transparent indicator-glass 3, disposed along the rear end of the oil-tank or in any convenient position where the same may be easily inspected, (the use to which the tank is put being taken into consideration.)

Crude petroleum in the condition in which it is taken from the oil-wells is opaque, and the result is that the oil itself cannot be used to indicate in the ordinary glass tubes the elevation of the oil in the tank, and I have provided means whereby I can use water slightly impregnated with salt, forming brine, giving it greater gravity than oil, so that the brine will seek the bottom and remain there when placed in a receptacle containing oil. This brine will not color the indicator-glass. Water without being impregnated with salt would probably serve the purpose, but I have found that by the insertion of a small quantity of salt it adds to its specific gravity and prevents its freezing, rendering brine a good liquid to be used in my device.

In the practical use of my indicating device the valve, disposed below the bottom of the oil-tank and in communication therewith, is first filled with brine until the ball-valve 4 rises and contacts with the wire screen 5. The wire screen 5 is disposed on a level with the bottom of the tank in the port between the casing and the oil-tank. The screen will prevent the ball from rising above the bottom of the tank and passing into the tank. Now as the tank is being filled with oil the ball-valve 4, following the level of the brine, will be depressed as the oil rises in the tank. I have shown the oil-level in the tank to be at a point marked 6, and the ball-valve 4 will be at the position shown in full lines in Fig. 1. The ratio of travel between the valve and the level of the oil will depend upon the relative size of the valve-casing and the transparent indicator glass tube 3. If the valve-casing 2 has a capacity, diametrically considered, six times greater than the glass tube 3, the ball-valve will descend one-sixth as far as the level of the oil rises in the tank. The brine or liquid used may be slightly colored, so that the level thereof may be easily ascertained by looking at the indicator-tube. Now if for any reason there should be a leakage in the glass tube at any point or pipes connected therewith and the brine should be crowded out thereby the oil will not be permitted to pass below the valve-seat 7, for the reason that ball-valve 4, having greater specific gravity than the oil and a less specific gravity than the brine, will follow the level of the brine down in the valve-casing until it rests upon the bottom which forms the valve-seat at that point and will stop the flow of oil and prevent the loss of the same. It will also prevent the oil from passing up into the glass indicator-tubes, discoloring the glass tube, which would render it opaque and prevent its use for the purpose desired.

It is often desirable in filling and refilling stationary tanks that the amount of oil in each tank should at all times be known in the office or station where a record is being kept of the same, and I have therefore provided means whereby the condition of the oil in any tank is shown in the office, where it may be readily ascertained at all times, to accomplish which I connect the station or office by means of separate pipes with each tank, each tank having an indicator 8, which will indicate the quantity of oil in the tank.

In Fig. 2 I have shown an indicator disposed adjacent to the floor of the office or station. It may be easily seen. As the location in the office where the indicators may be placed may be at a point far below the location of the oil in the tank connected therewith, I have provided means whereby the indicators may be placed in any position without reference to the elevation of the tanks containing the oil, and this is especially shown in Fig. 2. When the indicator is placed in the office without reference to the attitude of the oil-tank connected therewith, I place the proper quantity of colored brine in the valve-chamber, permitting it to fill therewith, after which the proper quantity of a light transparent oil is placed in the extension-tube 9 above the brine. When the light oil and brine are in place, the oil-tank is then filled with crude oil. This will cause the level of the light oil to rise in the indicator-tube 8 as the crude oil is put into the tank. The top of the crude oil and the light oil in the extension-tube will keep practically on a level. If the indicator-tube 8 has a diametric capacity six times as large as the extension-tubes 9, the brine will rise only one-sixth the distance that the crude oil in the tank and the light oil in the extension-tube rises. Therefore I am enabled to show the quantity of oil in the tank regardless of the elevation of the tank above the indicator. By using a light oil, or one having a specific gravity equal to the oil in the tank, the oil in the indicator-tube and in the extension-tube will approach approximately a uniform level; but if only brine is used in the valve and in the indicator-tube and in the extension-tube the level of the oil in the tank and brine in the indicator-tube would not be the same, owing to the greater specific gravity of the brine. To avoid the objection caused by the different specific gravity of these different liquids thereby, I use the light oil in the extension-tube, which will remain practically on a level with the oil in the tank. I have shown in Fig. 3 means whereby a signal may be given when the level of the liquid in the indicator-tube 3 reaches a predetermined point therein, as follows: The indicator-tube 3 is cut off at the point a little below the desired level of the liquid in the stationary tank and is provided with a cap 10 on the top thereof. Projecting through the walls of this cap, on opposite sides thereof, are contacts 11 and 12, which are insulated from the walls of the cap by insulation 13 and 14. Contact 12 is connected by wire 15 with one pole of battery 16. The other pole of this battery is connected by lines 17 with the signal 18, which in this case is shown as a bell-signal. This signal is connected by line 19 with contact 11. A port 20 in the top of the cap permits the air to flow in and out of the cap as the liquid in tube 3 rises and falls. Now when the liquid in tank 6 rises to the level of these contacts the liquid in tube 3 rises to these contacts and closes the circuit, thereby causing the bell to ring, thereby notifying the operator that the tank is as full as it is desired to have it filled.

Having described my invention, what I claim as new, and desire to secure by Letters Patent, is—

1. An oil-indicating device comprising a brine-containing valve disposed below the tank containing the oil, brine in said valve; a stopper in said valve having a specific gravity greater than the oil and less than the brine therein; an indicator-tube in communication with said valve; disposed on the outside of the tank containing the oil and brine in the indicator-tube.

2. Means to indicate the level of oil in an oil-tank comprising a valve disposed below and communicating with the oil-tank; a valve-stopper in said valve having a specific gravity greater than oil and less than brine; an indicator-tube in communication with said valve and disposed on the side of the tank containing the oil; brine in said valve and in the indicating-tube.

3. In an oil-indicator having a valve in the bottom thereof with a stopper therein of a specific gravity greater than oil and less than brine and having an indicator-tube in communication therewith located without and below the elevation of the tank containing the oil and having an extension projecting upwardly from said indicator-tube to a point level with the top of the tank containing the oil; brine in said valve and indicator-tube and a light, transparent oil in the extension-pipe above said indicator-tube.

4. In a device to indicate the quantity of crude oil in a tank comprising a valve disposed below the tank and having therein a valve-stopper of a specific gravity greater than the oil and less than the brine and having also an indicator-tube communicating with said valve and having in said indicator-tube and valve a liquid having a specific gravity greater than oil, the herein-described extension-tube disposed above the indicator-tube and having therein a transparent liquid of a like specific gravity with the crude oil.

5. The herein-described means to indicate the level of crude oil in a tank comprising the valve disposed below and communicating with the tank 1, the indicator-tube 3 communicating with said valve; a stopper 4 in
5 said valve having a specific gravity greater than crude oil and less than brine; brine in said valve and in said indicator-tube.

In witness that I claim the foregoing I have hereunto subscribed my name this 27th day of January, 1905.

WM. TORST, Jr.

Witnesses:
EDMUND A. STRAUSE,
MYRTLE JONES.